(12) United States Patent
Jugel

(10) Patent No.: US 9,009,213 B2
(45) Date of Patent: Apr. 14, 2015

(54) DISTRIBUTING PRE-RENDERING PROCESSING TASKS

(75) Inventor: Uwe Jugel, Dresden (DE)

(73) Assignee: SAP SE, Walldorf (DE)

(*) Notice: Subject to any disclaimer, the term of this patent is extended or adjusted under 35 U.S.C. 154(b) by 224 days.

(21) Appl. No.: 13/595,163

(22) Filed: Aug. 27, 2012

(65) Prior Publication Data
US 2014/0059109 A1 Feb. 27, 2014

(51) Int. Cl.
*G06F 15/16* (2006.01)
*G06F 9/50* (2006.01)

(52) U.S. Cl.
CPC .............. *G06F 9/5027* (2013.01); *Y02B 60/142* (2013.01)

(58) Field of Classification Search
USPC ...................... 709/201; 705/7.11; 725/80, 39; 701/209, 440
See application file for complete search history.

(56) References Cited

U.S. PATENT DOCUMENTS

| | | | |
|---|---|---|---|
| 7,493,213 B2* | 2/2009 | Lee et al. .................... | 701/446 |
| 8,204,642 B2* | 6/2012 | Tanaka et al. ............... | 701/28 |
| 8,352,990 B2* | 1/2013 | Higgins et al. .............. | 725/80 |
| 2003/0163253 A1* | 8/2003 | Lee et al. .................... | 701/209 |
| 2011/0276994 A1* | 11/2011 | Higgins et al. .............. | 725/39 |
| 2013/0066663 A1* | 3/2013 | Saito .......................... | 705/7.11 |

OTHER PUBLICATIONS

Adobe Systems Incorporated. "The NASDAQ Stock Market, Inc." 2009, 5 pages.
Begen and Civanlar. "High-Resolution Video Streaming in Mesh-Networked Homes." School of Electrical and Computer Engineering, Georgia Institute of Technology, Atlanta, Georgia and Institute of Electrical and Computer Engineering, Koc University, Istanbul, Turkey, respectively, 2005, 4 pages.
Bostock, M. "Data-Driven Documents." Aug. 10, 2012, 4 pages.
Chi and Riedl. "An Operator Interaction Framework for Visualization Systems." Department of Computer Science and Engineering, University of Minnesota, 1998, 8 pages.
Childs et al. "A Contract Based System for Large Data Visualization." Davis/Lawrence Livermore National Laboratory, University of California, 2005, 8 pages.
Corrigan, J. Options Price Reporting Authority, LLC. Aug. 15, 2011, 2 pages.
Hibbard et al. "Visualization Toolkit Extreme Testing." Vis Files, Aug. 2001, pp. 8-11.
Jin and Carbonell. "Predicate Indexing for Incremental Multi-Query Optimization." ISMIS 2008, LNAI 4994, 2008, pp. 339-350.
Kalyvianaki et al. "SQPR: Stream Query Planning with Reuse." Department of Computing, Imperial College London, United Kingdom and Institute for Infocomm Research, Singapore, 2011, 12 pages.
Keim et al. "Visual Analytics: Scope and Challenges." University of Konstanz and Pacific Northwest National Laboratory, National Visualization and Analytics Center, 2008, 15pages.

(Continued)

*Primary Examiner* — Tammy Nguyen
(74) *Attorney, Agent, or Firm* — Fish & Richardson P.C.

(57) ABSTRACT

A computer-implemented method for distributing pre-rendering processing tasks includes: mapping data processing tasks in a real-time visualization to a visualization processing model, the real-time visualization involving data from a backend system to be rendered by a frontend system; receiving a processing cost model derived from processing-node information; determining, using the mapped data processing tasks and the models, an execution plan for the real-time visualization; and for each of the mapped data processing tasks, and according to the determined execution plan, assigning the backend system or the frontend system to perform the task.

18 Claims, 11 Drawing Sheets

(56) References Cited

OTHER PUBLICATIONS

Lakshmanan et al. "Placement strategies for internet-scale data stream systems." Internet Computing, IEEE, 12(6), 2008, pp. 50-60.
Leavitt, N. "Complex-event processing poised for growth. Computer", IEEE, 42(4), Apr. 2009, pp. 17-20.
Lee and Grinstein. "An architecture for retaining and analyzing visual explorations of databases." Proceedings of the 6$^{th}$ IEEE Visualization Conference, 1995, pp. 101-108.
Plattner. and Zeier. "An Inflection Point for Enterprise Applications." In: *In-Memory Data Management* (Springer-Verlag Berlin Heidelberg, 2011), pp. 1-23.
Schroeder et al. "The Design and Implementation of an Object-Oriented Toolkit for 3D Graphics and Visualization." GE Corporate Research & Development, 1996, 9 pages.
Sellis, T.K. "Multiple-Query Optimization." ACM Transactions on Database Systems, vol. 13, No. 1, Mar. 1988, pp. 23-52.
Shneiderman, B. "Treemaps for space-constrained visualization of hierarchies." ACM Transactions on Graphics, 1998, pp. 92-99.
Wang et al. "Visualization of large hierarchical data by circle packing." CHI 2006, Montréal, Canada, Apr. 22-28, 2006, pp. 517-520.
Wikipedia [online] "Cloud gaming," Aug. 26, 2011, [retrieved on Aug. 27, 2012]. Retrieved from the Internet:<URL: http://en.wikipedia.org/w/index.php?title=Cloud_gaming&oldid=446805361>. 3 pages.
Wikipedia [online] "HTML5," Aug. 25, 2011, [retrieved on Aug. 27, 2012]. Retrieved from the Internet:<URL: http://en.wikipedia.org/w/index.php?title=HTML5&oldid=446732878>. 10 pages.
Wikipedia [online] "StreamBase Systems," Jul. 9, 2010, [retrieved on Aug. 27, 2012]. Retrieved from the Internet:<URL: http://en.wikipedia.org/w/index.php?title=StreamBase_Systems&oldid=372493549>. 2 pages.
Wikipedia [online]. "Web Socket," Aug. 26, 2011, [retrieved on Aug. 27, 2012]. Retrieved from the Internet:<URL: http://en.wikipedia.org/w/index.php?title=WebSocket&oldid=446852473>. 6 pages.
Wilson, M., Host; McGovern and Parker, Speakers. "Sybase: Introduction to Complex Event Processing (CEP) in Capital Markets," Professional PowerPoint Presentation, Jun. 2010, Sybase, www.sybase.com/capitalmarkets, 25 pages.
Wu et al. "High-performance complex event processing over streams." SIGMOD 2006, Chicago, Illinois, Jun. 27-29, 2006, pp. 407-418.
Wuensche, B. "Chapter 2: VTK—The Visualization Toolkit," Professional PowerPoint Presentation, 2006, http://www.cs.auckland.ac.nz/~burkhard, 7 pages.

\* cited by examiner

Visualization and Data Examples line chart (800A)
- 802A: $d = |\{x,y\}| = 2$
- 804A: 
  ```
  data = [
    [ 0, 1, 2, 3, 4, 5 ], //x
    [ 5, 3, 4, 1, 9, 7 ] //y
  ]
  n = 6
  ``` scatter plot (800B)
- 802B: $d = |\{x,y,r\}| = 3$
- 804B:
  ```
  data = [
    //x, y, r
    [1, 8, 1],
    [3, 2, 3],
    [5, 9, 6],
    [7, 4, 2],
  ]
  n = 4
  ```

Target Device Parameters

806:
- p: 1M // CPU power: 1 million instructions/sec
- b: 10800M // max CPU instructions a full battery can sustain
- // 1M instr./s * 300 * 3h = 10800M instructions
- // ~> 3h battery life at full CPU load

User/Rendering Parameters

808:
- f: frame rate

Visualization Parameters

810:
- d: number of geometric dimensions
- n: number of visual elements

FIG. 8

DISTRIBUTING PRE-RENDERING PROCESSING TASKS

BACKGROUND

Mobile devices have, relatively speaking, limited resources and performance. For example, battery life and the power of the central processing unit (CPU) or of the graphics processing unit (GPU) are among the reasons for this. Mobile device applications, e.g., for business intelligence and monitoring, may consume real-time data that needs to be rendered continuously on the device. The required data-transfer and visualization rendering can consume device resources at a very high rate when displaying data, particularly if the visualization is to be performed at a rate of 10-60 frames per second. To an extent, this is true also for some or all other data visualization devices, such as personal computers (PCs). Real-time visualization, on any device, induces a continuous consumption of energy caused by the CPU/GPU processing for each frame.

Furthermore, resource limitations in hardware (e.g., on current mobile devices) or in software (e.g., browser-based applications), can restrict the types of (real-time) applications that can be provided for a certain platform (e.g., for mobile web applications).

SUMMARY

In a first aspect, a computer-implemented method for distributing pre-rendering processing tasks includes: mapping data processing tasks in a real-time visualization to a visualization processing model, the real-time visualization involving data from a backend system to be rendered by a frontend system; receiving a processing cost model derived from processing-node information; determining, using the mapped data processing tasks and the models, an execution plan for the real-time visualization; and for each of the mapped data processing tasks, and according to the determined execution plan, assigning the backend system or the frontend system to perform the task.

In a second aspect, a computer program product is embodied in a non-transitory computer-readable storage medium and includes instructions that when executed by a processor perform a method for distributing pre-rendering processing tasks. The method includes: mapping data processing tasks in a real-time visualization to a visualization processing model, the real-time visualization involving data from a backend system to be rendered by a frontend system; receiving a processing cost model derived from processing-node information; determining, using the mapped data processing tasks and the models, an execution plan for the real-time visualization; and for each of the mapped data processing tasks, and according to the determined execution plan, assigning the backend system or the frontend system to perform the task.

In a third aspect, a system includes: one or more processors; and a computer program product embodied in a non-transitory computer-readable storage medium and comprising instructions that when executed perform a method for distributing pre-rendering processing tasks. The method includes: mapping data processing tasks in a real-time visualization to a visualization processing model, the real-time visualization involving data from a backend system to be rendered by a frontend system; receiving a processing cost model derived from processing-node information; determining, using the mapped data processing tasks and the models, an execution plan for the real-time visualization; and for each of the mapped data processing tasks, and according to the determined execution plan, assigning the backend system or the frontend system to perform the task.

Implementations can provide any or all of the following features. Mapping the data processing tasks comprises identifying at least one geometric primitive. The real-time visualization includes adding data to, or removing data from, the identified geometric primitive. The real-time visualization includes updating a data value for the identified geometric primitive. The method further includes providing, after the mapped data processing tasks are performed, raw data and geometry from the backend system to the frontend system, the geometry obtained by the backend system performing at least one of the identified data processing tasks on the raw data. The method further includes determining, with regard to a different frontend, a different execution plan for the real-time visualization.

Implementations can provide any or all of the following advantages. Distributed complex event processing (CEP) can spread workload on-demand to many CEP nodes, and combine it with web servers working as an event stream broker and visualization pipeline for the connected web clients. Specific visualization-related tasks can be shifted from a device to a backend. Backend visualization operators can enrich event streams with geometry data. A clear separation of which parts of a transformation can be expressed as classical relational database operator and which parts require additional processing (e.g., using custom, stateful operators) can be obtained. Data processing and rendering can be sped up to enable real-time visualizations, while energy consumption on the device can be reduced.

The details of one or more implementations are set forth in the accompanying drawings and the description below. Other features and advantages will be apparent from the description and drawings, and from the claims.

DESCRIPTION OF DRAWINGS

FIG. 8 shows an example of optimizing visualizations.

Like reference symbols in the various drawings indicate like elements.

DETAILED DESCRIPTION

This document describes systems and techniques that can offload pre-rendering processing tasks from a frontend to a backend. When a data stream is to be visualized in real time (e.g., in form of one or more continuously updated and interactive graphs or charts), a system can determine based on the static processing capacity and/or current workload of a frontend device (e.g., a smartphone or a tablet), which one(s) of the pre-rendering processing tasks involved in the real-time visualization should instead be performed in a backend. For example, such offloaded processing task(s) can serve to generate one or more pieces of geometry that can then be forwarded to the frontend with the raw data, in order to make the real-time visualization more efficient.

Figure 1:
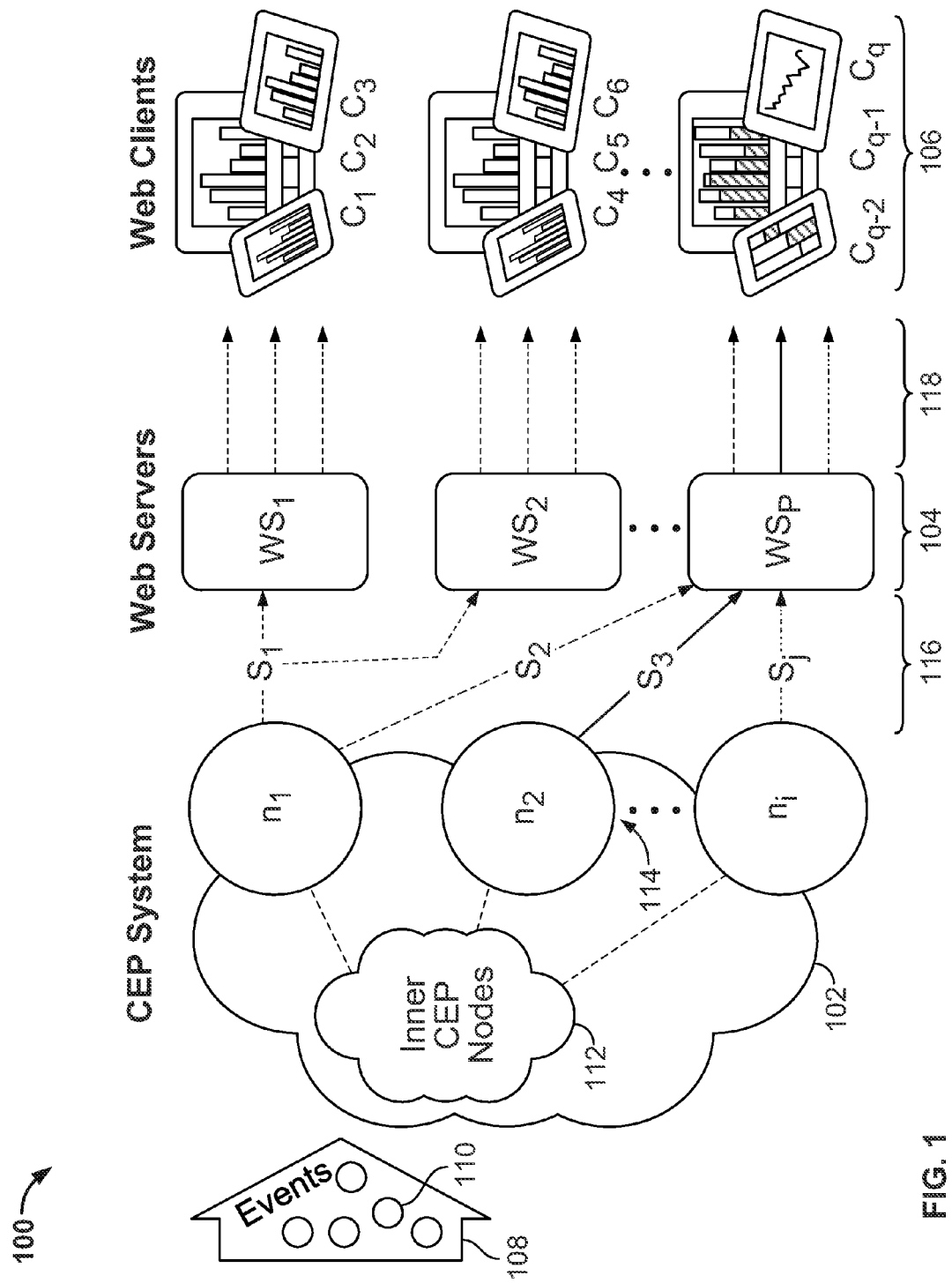
FIG. 1 shows an example of a system that can be used for distributing pre-rendering processing tasks.

FIG. 1 shows an example of a system 100 that can be used for distributing pre-rendering processing tasks. The system 100 includes a complex event processing (CEP) system 102, one or more web servers 104 and one or more web clients 106. For example, the CEP system 102 can receive data 108 that represents one or more events 110, and can deliver that data, in some form, so that the data can be visualized in real time by the web client(s) 106. The CEP system 102 includes inner CEP nodes 112 and i number of CEP end-nodes 114, here labeled $n_1$ through $n_i$, respectively. Moreover, the web servers include p number of servers, here labeled $ws_1$ through $ws_p$, respectively. Finally, the web clients include q number of clients, here labeled $c_1$ through $c_q$, respectively.

The CEP system 102 can process high-velocity data in real time, such as for scenarios where sub-second latency is important. Examples of such scenarios include, but are not limited to, electronic trading systems, military surveillance, manufacturing automation, pipeline monitoring, fraud detection, and tolling. That is, the CEP system 102 can process data, here named complex events, rapidly and provide the results thereof to one or more higher level applications. In some implementations, a human will be informed by such systems about certain complex events, and/or the system can continuously push high-frequency data to one or more connected clients. Such data can be further processed and will eventually be visualized on a client device, for example as a bitmap or an interactive chart in a visual analytics application.

For these and other purposes, the CEP system 102 can spread workload on-demand to some or all CEP nodes. Moreover, the CEP system 102 uses web server technology, here in form of the web servers 104, which works as an event stream broker and visualization pipeline for the web clients 106.

Here, CEP outbound channels 116 connect each of the CEP end-nodes 114 with one or more of the web servers 104. In this implementation, there are j number of CEP outbound channels, labeled $s_1$ through $s_j$, respectively. Here, $s_1$ goes from $n_1$ to $ws_1$ and $ws_2$; $s_2$ goes from $n_1$ to $ws_p$, $s_3$ goes from $n_2$ to $ws_p$, and $s_j$ goes from $n_i$ to $ws_p$, to name just a few examples. Corresponding web server output streams 118 are then provided to respective ones of the web clients 106.

Figure 2:
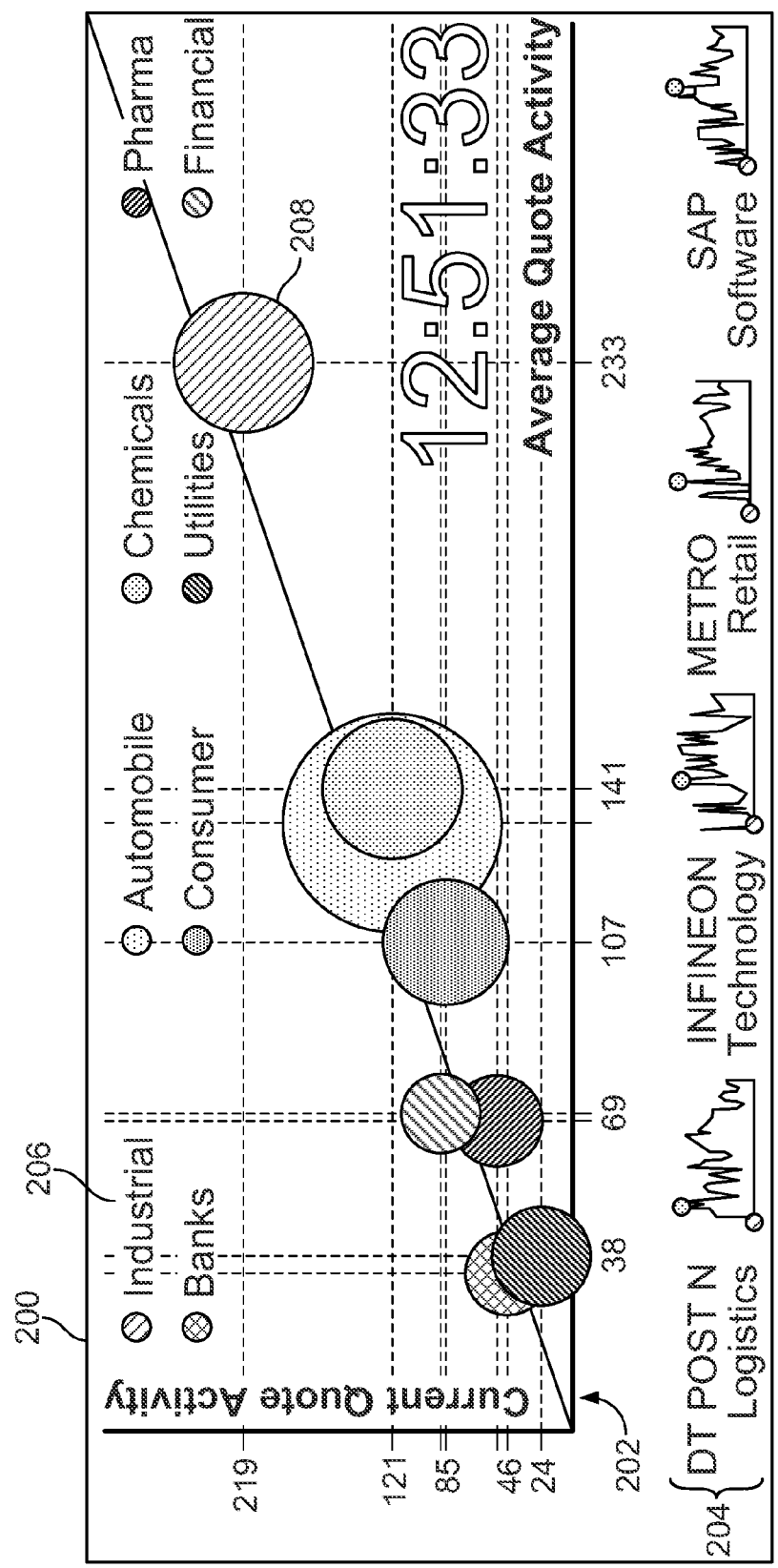
FIG. 2 shows an example of a visualization that can be generated after distributing pre-rendering processing tasks.

FIG. 2 shows an example of a visualization 200 that can be generated after distributing pre-rendering processing tasks. For example, the visualization can be rendered in real time on any or all of the web clients 106 (FIG. 1.) The visualization 200 in this example relates to activity of a stock market. For example, real-time stock prices and quote data can be streamed to a hypertext markup language (HTML) program, such as an HTML5 application, for visualization and optionally user drilldown through one or more interactive features.

Particularly, the visualization includes a scatter plot 202 and multiple line charts 204. The scatter plot 202 shows the number of quotes in each of multiple market sectors 206, here referred to as "prime," and allows the user to drill down into the appropriate subsector of that market, here referred to as "sub prime." Each of the market sectors 206 is represented by a corresponding circle 208 that reflects the current quote activity and the average quote activity of that market sector. For example, the "industrial" market sector has a current quote activity of "219" and an average quote activity of "233." The line charts 204 show stock price trends for the top k companies. In some implementations, the scatter plot 202 and/or the line charts 204 present aggregations of real-time data and allow de-aggregations on-demand.

In order to present visualizations of stock market data, for example, a scatter plot geometry must continuously be computed for the primes and the sub primes, as well as several line chart geometries for each of the top k stocks. Such geometry computations can make up a significant part of the client-side continuous processing, and they are therefore a good candidate for being outsourced to the backend. This will be further illustrated by the next example.

Figure 3:
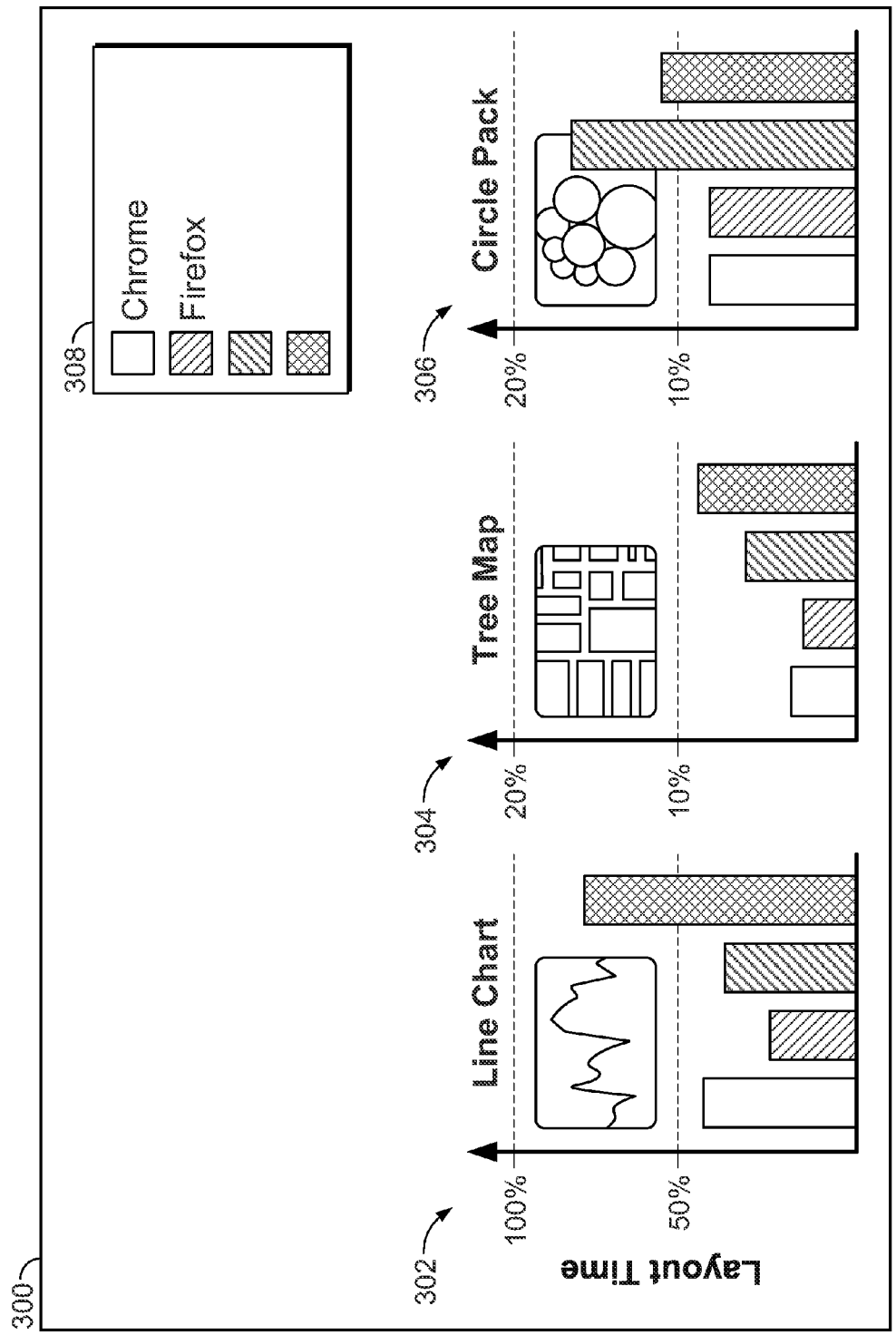
FIG. 3 shows examples of charts illustrating layout and geometry computation in relation to overall client-side processing.

FIG. 3 shows examples of charts 300 illustrating layout and geometry computation in relation to overall client-side processing. Multiple real-time visualization test cases were implemented. For each visualization, the layout and geometry computations were distinguished from the updating and drawing of the document object model (DOM) that were also part of the client-side processing. Three tests were performed: (1) generation of an svg:path for a line chart; (2) treemap layouting; and (3) circle pack layouting. Here the results of these three tests are presented in charts 302-06, respectively. The individual results in each chart were obtained using different browsers, as indicated by a legend 308. The results show that layout computation performance can vary significantly with the use case. For example, with regard to the line chart generation (chart 302), a relatively high workload of up to 78% of the overall client-side processing was observed. It is believed that this at least in part is caused by numerous string concatenations in the browser's JavaScript virtual machine (e.g., so-called memcpy operations) that are required for creating the "d" attribute of the svg:path. Accordingly, depending on the rendering technology, relatively expensive visualization operators exist that can benefit from backend processing.

Figure 4:
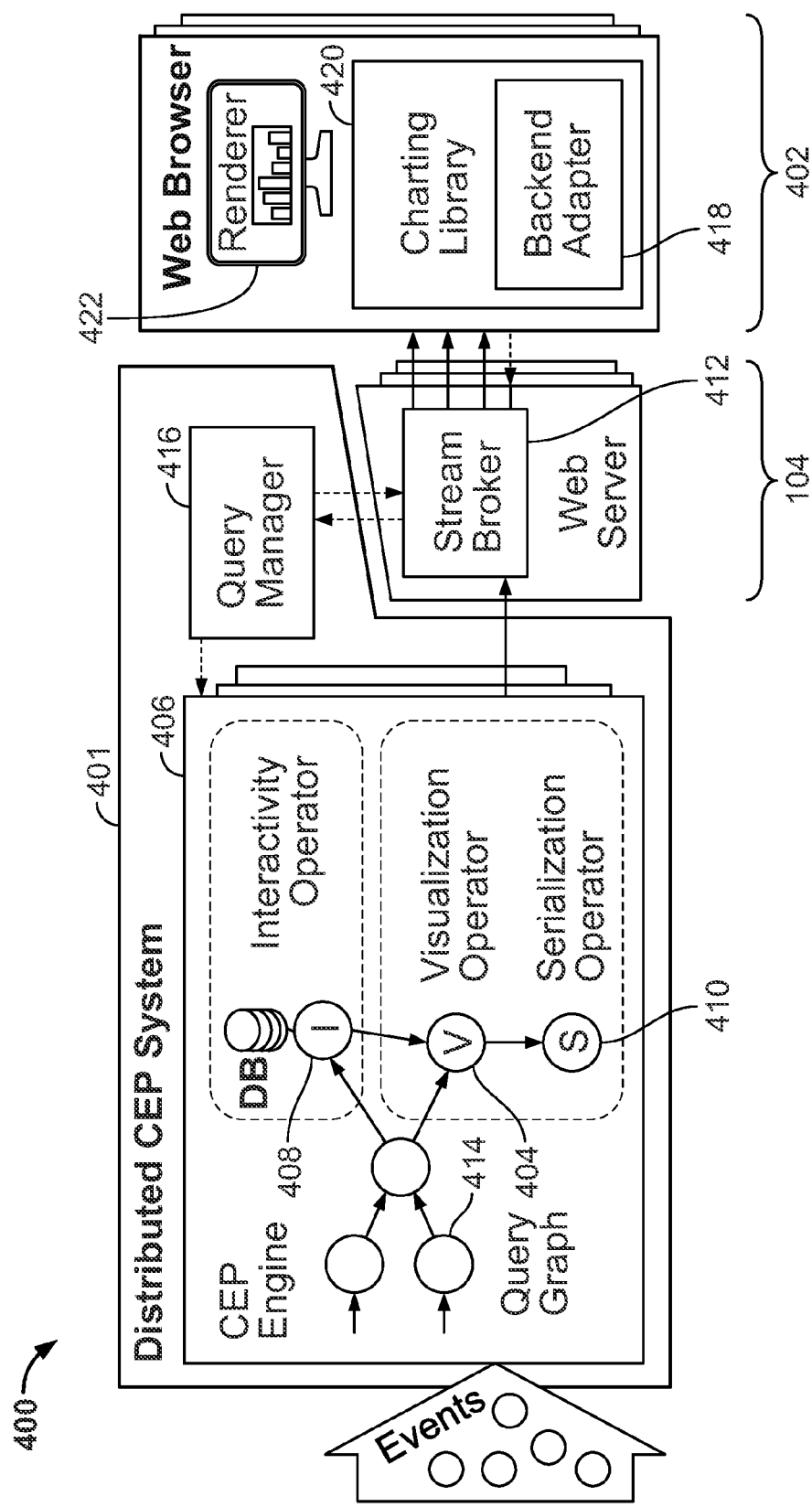
FIG. 4 shows another example of a system that can be used for distributing pre-rendering processing tasks.

FIG. 4 shows another example of a system 400 that can be used for distributing pre-rendering processing tasks. The system 400 includes a distributed CEP system 401, some or all of the web servers 104, and one or more web browsers 402. Particularly, visualization operators 404 that can be applied to many kinds of events are here run inside a CEP engine 406. For example, the visualization operators can there be optimized together with other operators in the pipeline. Such operators include, but are not limited to, interactivity operators 408 (e.g., for use in scheduling visualization-related queries even if no client currently receives the results, to allow for more instantaneous interaction), and serialization operators 410 (e.g., for leveraging reuse of subsumed queries by the CEP engine to reduce the number of processing pipelines per visualization.) For example, event streams can be serialized, such as into JavaScript object notion (JSON) or extensible markup language (XML), to be consumable by the clients. In certain implementations, some or all of the visualization and serialization operators are stateless operations.

Here, the system 400 is an example of a CEP-centric architecture, where all visualization-specific operators can be processed directly in the CEP engine 406. This can allow the web server(s) 104 to act as a pure stream broker 412 for distributing the event streams and managing hypertext transfer protocol (HTTP) sessions.

The interactivity and visualization operators are here derived from visualization requirements of higher level applications. In some implementations, they may therefore exist close to the leaves of the operator network, such as at the end of a query graph 414 in the CEP engine 406. For example, this can reflect the behavior of an external processing pipeline (e.g., in a web-server centric system.)

The system 400 also includes a query manager 416. In some implementations, when a new query is issued by a client, the query can be sent to the query manager 416 to have a new channel set up, or if the query matches with an existing query, the client can be mapped to an existing channel. Here, each of the web browsers 402 can include a backend adapter 418 that is part of a charting library 420. Once the web browser(s) 402 has/have the data needed for the visualization, the content is rendered by a renderer 422.

Figure 5:
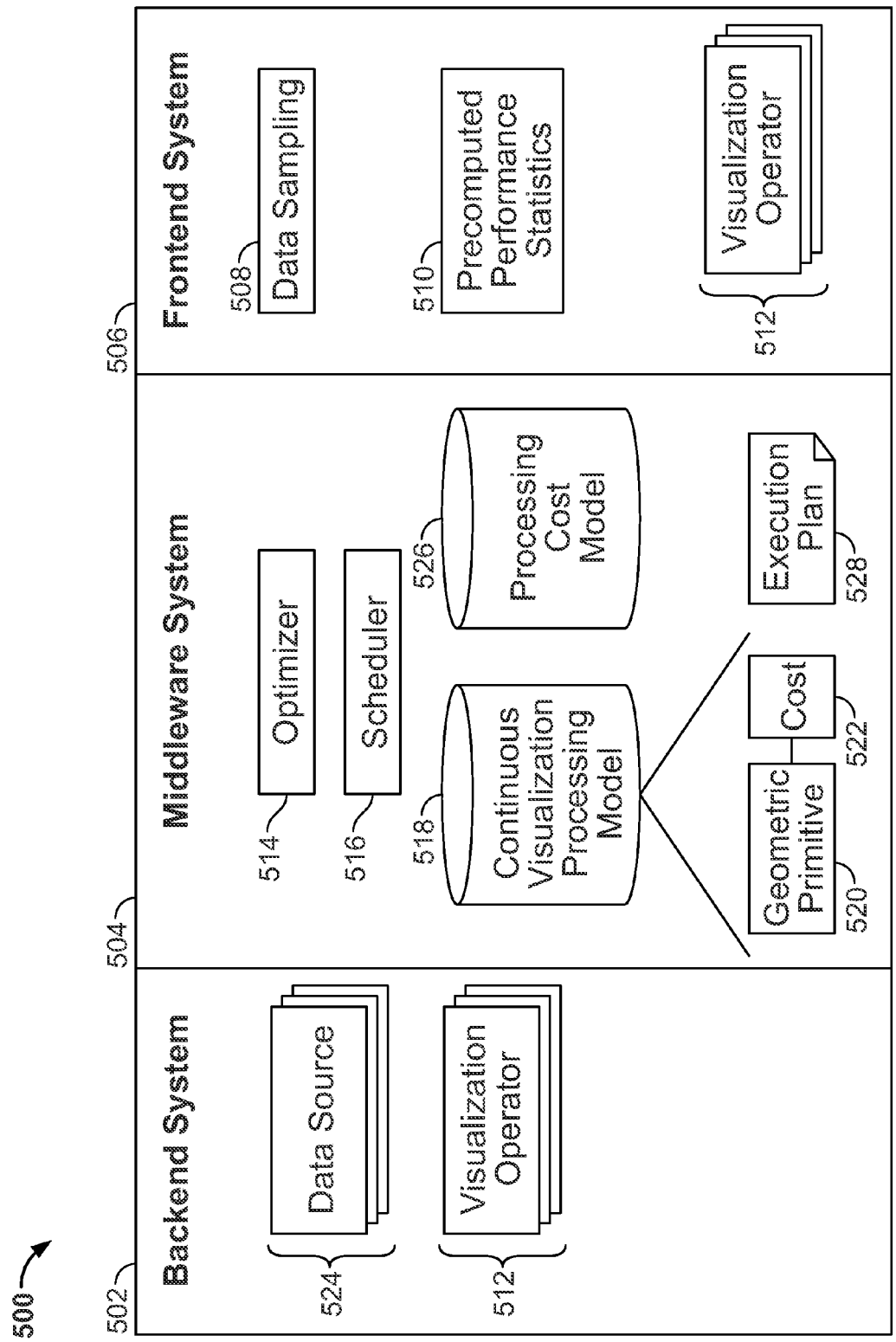
FIG. 5 shows another example of a system that can be used for distributing pre-rendering processing tasks.

FIG. 5 shows another example of a system 500 that can be used for distributing pre-rendering processing tasks. Here, the system 500 includes a backend system 502, a middleware system 504 and a frontend system 506. In some implementations, one task of the middleware system is to optimize the data stream processing based on device capabilities, the type of data, and the type of visualization to be rendered continuously. For example, the middleware system can seek to offload one or more pre-rendering processing tasks from the frontend system to the backend system, where it/they can be made part of data stream processing.

The frontend system 506 uses data sampling 508 and pre-computed performance statistics 510 for all generic visualization types to gather the information required for optimization. For example, the goal of such optimization can be to define which of multiple visualization operators 512 cannot be handled efficiently by the frontend system, so that they can instead be run in the backend system. For example, a database or a streaming engine in the backend system can be used to conduct the offloaded pre-rendering processing task(s).

For these and other purposes, the middleware system 504 includes an optimizer component 514 and a scheduler component 516. Particularly, the middleware system performs optimization and cost-estimation based on a continuous visualization processing model 518 to compose the requested visualizations. The model 518 defines different types of geometric primitives 520 and associates with each of them a respective computation cost 522 for continuously drawing the geometric primitive. That is, the model 518 allows a decomposition of the complete visualization creation process into the visualization operators 512, and also to decompose a visualization into a set of geometric primitives. These operators can include typical database operators (e.g., selections, projection, aggregation) and/or arithmetic operations (e.g., scalar transformations) on set-based data.

The costs 522 can be determined in any suitable way. In some implementations, multiple parameters and constraints in the system are taken into account. For example, they can include, but are not limited to, any or all of the following: (1) computation cost in the frontend system (device dependent); (2) computation cost in the backend; (3) a desired min/max rendering performance (e.g., desired frame rate); (4) device parameters (e.g., CPU or GPU power, or battery capacity); (5) pre-rendering performance per Watt on the consumption device; (6) cost of data transfer from the backend to the frontend; and (7) data transfer cost in the frontend (e.g., battery).

That is, the system 500 can compute a cost for each of the visualization operators 512 and derive an optimal placement of this operator. In some implementations, this placement is selected between the frontend and the backed. In other implementations, some or all of the visualization operators are implemented both in the frontend and the backend, and the derivation then determines where the task should be performed. Usually, more than one client consumes data from each of multiple data sources 524 in the backend system, and since more powerful devices have different costs, different optimal placements can be derived for different clients in some scenarios.

In some implementations, further improved placement of operators in the backend system can be achieved by using operator placement techniques from database/data-streaming approaches. Then, the model 518 can facilitate an efficient use of such techniques, for example by expressing the computation required for creating the visualization as relational algebra operators in combination with common arithmetic operations.

That is, the middleware system 504 can map data-processing tasks of real-time visualizations to the model 518 and use this model together with a processing cost model 526 derived from processing-node information. For example, such information can include, but is not limited to, CPU-power and desired frame rate. By evaluating the combined model data, the middleware system can compute an optimal execution plan 528 for the system 500. In some implementations, the execution plan 528 specifies how to offload client-side rendering tasks (e.g., client-side pre-rendering data processing steps) to a more powerful system, such as the backend system 502. That way, the middleware system can speed up data processing and rendering, for example to enable real-time visualizations, and at the same time reduce the required energy consumed on the frontend device.

Figure 6:
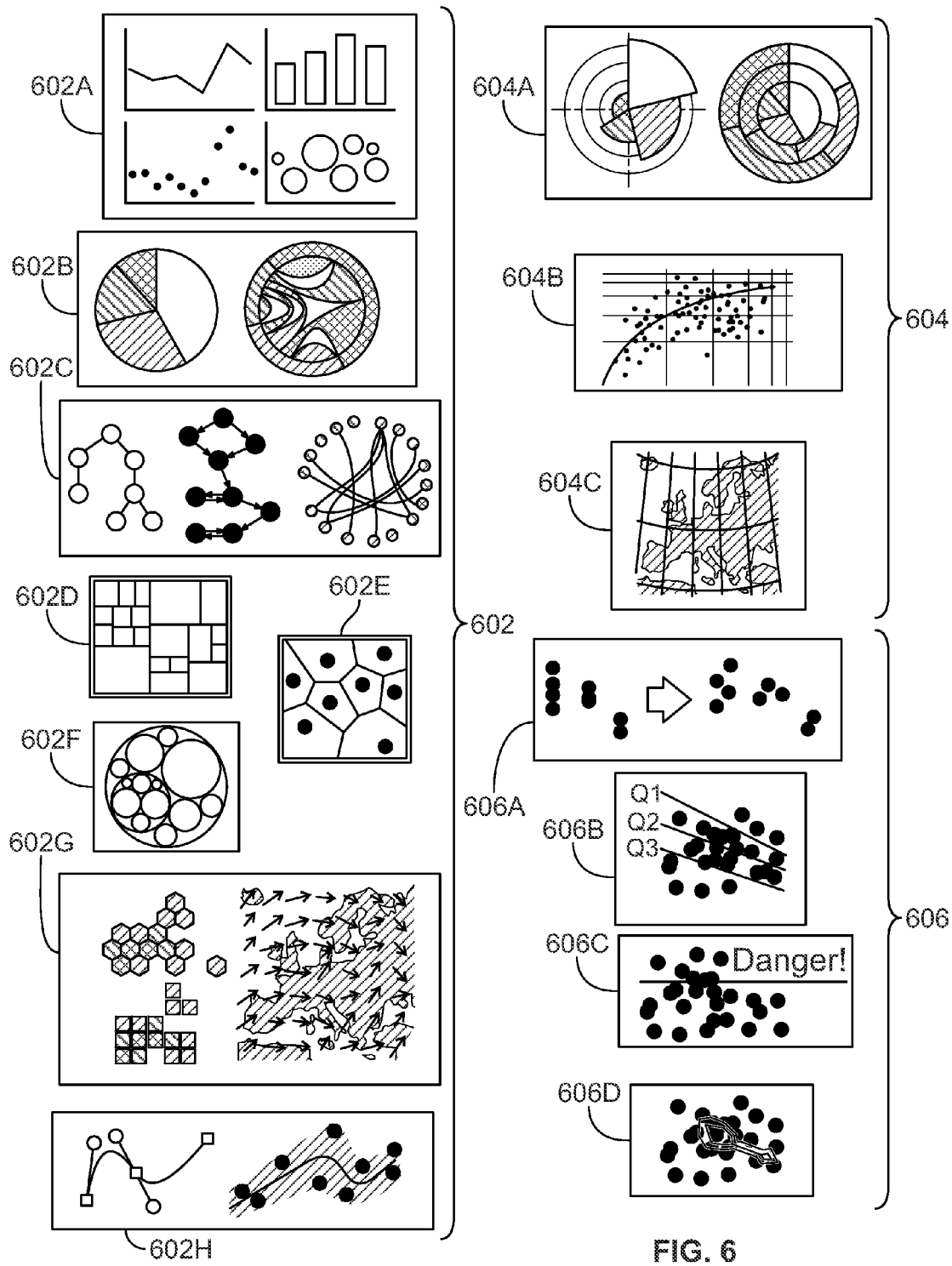
FIG. 6 shows examples of aspects of real-time visualization.
Figure 7A:
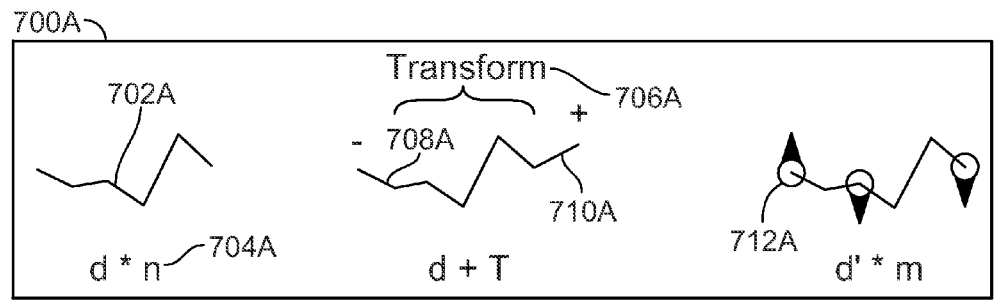
FIGS. 7A-F shows examples of computations regarding some geometries.
Figure 7B:
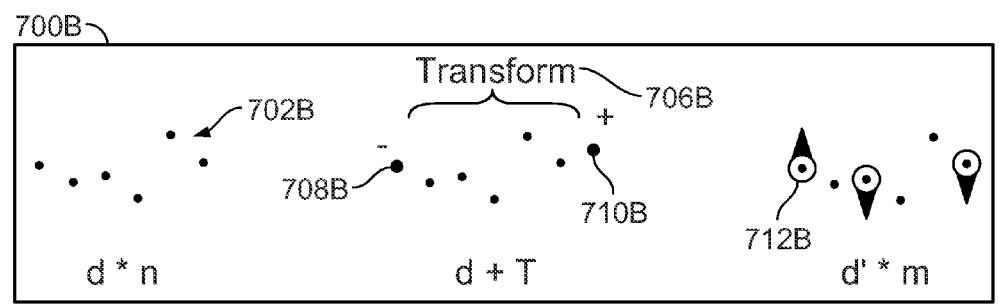
Figure 7C:
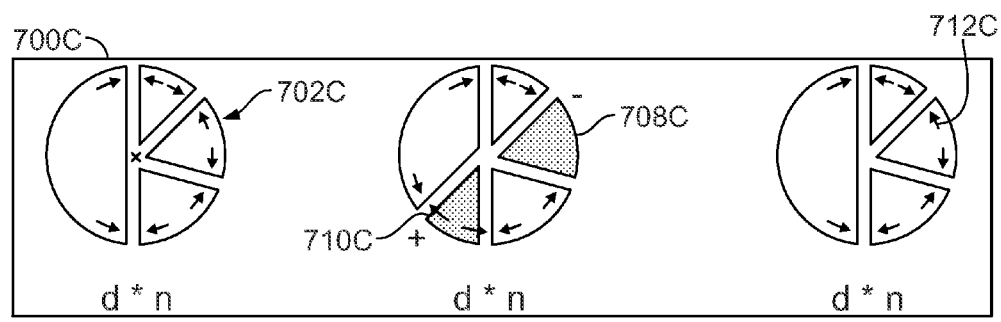
Figure 7D:
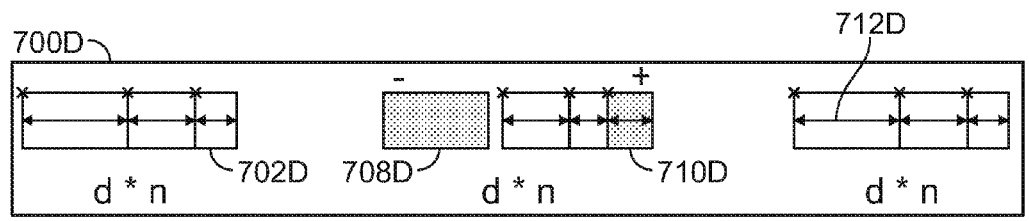
Figure 7E:
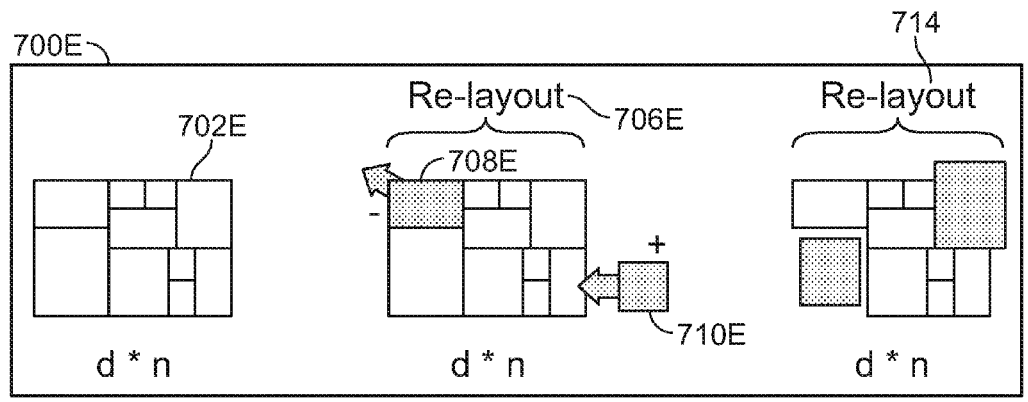
Figure 7F:
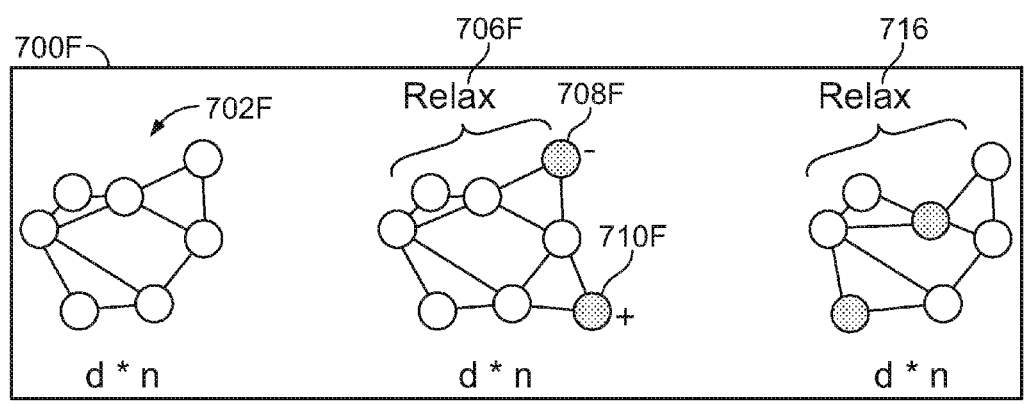

FIG. 6 shows examples of aspects 600 of real-time visualization. In this example, the aspects 600 include chart types and chart layouts 602, coordinate transformations 604 and additional transformations 606. These are mentioned as examples only, and some real-time visualizations can include one or more other aspects instead of, or in addition to, any of the shown ones.

Among the chart types and chart layouts 602, charts 602A involve simple charts using geometric primitives. Charts 602B involve charts with complex geometry. Charts 602C involve trees and graphs. Chart 602D involves a tree map. Chart 602E involves Voronoi cells. Chart 602F involves a circle pack. Charts 602G involve tile-based grouping. Charts 602 involve parametric primitives and/or interpolation.

Among the coordinate transformations 604, transformations 604A involve polar coordinates. Transformation 604B involves logarithmic coordinates. Transformation 604C involves geographic coordinates.

Among the additional transformations 606, transformation 606A involves jittering. Transformation 606B involves quantile lines. Transformation 606C involves guides and/or threshold bars. Transformation 606D involves a contour marker.

FIGS. 7A-F shows examples of computations 700A-F regarding some geometries. Each computation is characterized by the type(s) of chart it applies to, the kind of function involved, and what is the incremental computation, to name a few examples.

In some implementations, the computations 700A-B relate to simple geometries in which a scaling factor is determined. For example, the computation 700A involves a line-based chart 702A. This relates to area charts, stacked line charts and error tubes, to name just a few examples. The full computation involves taking the underlying data and computing for it the geometrical shape represented by the line-based chart.

The full computation is characterized by an expression 704, which here is "d*n." The variable d stands for the number of geometric dimensions that need to be computed initially. This is usually all displayed dimensions. Such dimensions can include, but are not limited to, x, y, width, height, and radius, to name a few examples. The variable n stands for the number of visual elements that need to be drawn initially. This is the full data range of a chart. That is, the expression d*n indicates that d*n values need to be computed in the initial computation effort; for each data value, one value must be computed for each geometric dimension. Examples involving these and other variables will be described further below.

One or more incremental computations can now be performed on the line-based chart 702A. In some implementations, data can be added and/or removed. This corresponds to a transform 706A performed on the line-based chart 702A. For example, the transform can involve removing a segment 708A from the line-based chart, as schematically indicated by a minus sign. As another example, the transform can involve adding a segment 710A to the line-based chart, as schematically indicated by a plus sign. The incremental computation is characterized by "d+T." The variable T stands for a geometric transformation that replaces raw value-recomputations.

In some implementations, one or more values can be updated. This corresponds to an update 712A performed on at least one of the segments in the line-based chart. This incremental computation is characterized by "d'*m." The variable d' stands for the number of modified geometric dimensions that need to be recomputed. That is, not all dimensions are necessarily affected by a data update. The variable m stands for the number of visual elements that need to be drawn on a partial data update.

The geometric transformation T mentioned above with regard to the transform 706A can be cheaper in terms of system resources than recomputing d*n or d*m. For example, if one new data point enters the chart, only 1*d values need to be computed for the new visual element, rather than n*d for the full chart. The visual modifications to the remaining data elements, whose data are unchanged, can be expressed by the geometric transformation T that that has a lower computation cost than a computation of n*d values. Hence, the incremental computation in the transform 706A can be characterized by d+T.

With some geometries, no cheaper operation T may exist. This can be the case because the change of one element will affect the complete geometry. For example, for many stacked (e.g., wedge-based) charts, the incremental update will still require d*n number of value computations.

The line-based chart 702A can be encoded in any suitable way. In some implementations, the line-based chart is encoded as a string, a simple list, and/or as a tuple list. The following are examples of usage:

```
<path d="m 300,380 10,5 10,-1 10,7 10,-21 10,9">
new Polygon([300,10,10,10,10,10],[380,5,-1,7,-21,9],6)
```

As another example, the computation 700B involves a point-based chart 702B. This relates to point clouds, bar charts and scatter plots, to name just a few examples. The full computation involves taking the underlying data and computing for it the point locations represented by the point-based chart. The full computation is characterized by "d*n."

One or more incremental computations can now be performed on the point-based chart 702B. In some implementations, data can be added and/or removed. This corresponds to a transform 706B performed on the point-based chart 702B. For example, the transform can involve removing a point 708B from the point-based chart. As another example, the transform can involve adding a point 710B to the line-based chart. The incremental computation is characterized by "d+T."

In some implementations, one or more values can be updated. This corresponds to an update 712B performed on at least one of the points in the point-based chart. This incremental computation is characterized by "d'*m."

The point-based chart 702B can be encoded in any suitable way. In some implementations, the line-based chart is encoded as a tuple list. The following are examples of usage:

```
<circle ... >
<circle cx="160" cy="230" r="3">
<circle ... >
{new Ellipse2D.Double ...,
new Ellipse2D.Double(160, 230, 3, 3),
new Ellipse2D.Double ...}
```

In some implementations, the computations 700C-D relate to linked geometries in which a scaling function is applied. For example, the computation 700C involves a wedge-based chart 702C. This relates to contour markers, parametric curves, interpolation lines, quantiles and guides, to name just a few examples. The full computation involves taking the underlying data and computing for it the wedge components represented by the wedge-based chart. The full computation is characterized by "d*n."

One or more incremental computations can now be performed on the wedge-based chart 702C. In some implementations, data can be added and/or removed. For example, a wedge component 708C can be removed from the wedge-based chart. As another example, a wedge component 710C can be added to the wedge-based chart. The incremental computation is characterized by "d*n."

In some implementations, one or more values can be updated. This corresponds to an update 712C performed on some or all the wedge components in the wedge-based chart. This incremental computation is characterized by "d*n."

The wedge-based chart 702C can be encoded in any suitable way. In some implementations, the line-based chart is encoded as a string list, and/or as a tuple list. The following are examples of usage:

```
<path ... >
<path d="m 94,405 a 24,24 0 0 1 18, -23 1 6,23 z">
<path ... >
{new Arc2D.Double ...,
new Arc 2D.Double(94, 405, 150, 100, 0, 270, Arc2D.PIE),
new Arc 2D.Double ...}
```

As another example, the computation 700D involves a stacked primitive chart 702D. This relates to stacked line charts and stacked bar charts, to name just a few examples. The full computation involves taking the underlying data and computing for it the primitive geometries represented by the stacked primitive chart. The full computation is characterized by "d*n."

One or more incremental computations can now be performed on the stacked primitive chart 702D. In some implementations, data can be added and/or removed. For example, a primitive 708D can be removed from the point-based chart. As another example, a primitive 710D can be added to the stacked primitive chart. The incremental computation is characterized by "d*n."

In some implementations, one or more values can be updated. This corresponds to an update 712D performed on at least one of the primitives in the stacked primitive chart. This incremental computation is characterized by "d*n."

The stacked primitive chart 702D can be encoded in any suitable way. In some implementations, the stacked primitive chart is encoded as a string list, and/or as a tuple list. The following are examples of usage:

```
<div ... >
  <div style="{top: 60; left: 30; width: 18; height: 80;}">
    < div ... >
```

In some implementations, the computations 700E-F relate to layouted geometries in which complex and/or recursive scaling functions are used. For example, the computation 700E involves a hierarchical chart 702E. This relates to hierarchical tree maps, "sticky" tree maps, Voronoi tree maps, and circle packs, to name just a few examples. The full computation involves taking the underlying data and computing for it the hierarchical shapes represented by the hierarchical chart. The full computation is characterized by "d*n."

One or more incremental computations can now be performed on the hierarchical chart 702E. In some implementations, data can be added and/or removed. This corresponds to a re-layout 706E performed on the hierarchical chart 702E. For example, the re-layout can involve removing a shape 708E from the hierarchical chart. As another example, the re-layout can involve adding a shape 710E to the hierarchical chart. The incremental computation is characterized by "d*n."

In some implementations, one or more values can be updated. This corresponds to a re-layout 714 performed on the hierarchical chart. This incremental computation is characterized by "d*n."

The hierarchical chart 702E can be encoded in any suitable way. In some implementations, the hierarchical chart is encoded as a tuple list (e.g., as a flat list of rectangles.) The following are examples of usage:

```
<div ... >
  <div style="{top: 60; left: 30; width: 18; height: 80;}">
    < div ... >
    {new Rectangle2D.Double ...,
     new Rectangle 2D.Double(60, 30, 18, 80),
     new Rectangle 2D.Double ...}
```

As another example, the computation 700F involves an interconnected chart 702F. This relates to any graph or tree that uses edges and nodes, to name just a few examples. The full computation involves taking the underlying data and computing for it the geometries represented by the interconnected chart. The full computation is characterized by "d*n."

One or more incremental computations can now be performed on the interconnected chart 702F. In some implementations, data can be added and/or removed. This corresponds to a relaxation 706F performed on the interconnected chart 702F. For example, the relaxation can involve removing a geometry 708F from the interconnected chart. As another example, the relaxation can involve adding a geometry 710F to the interconnected chart. The incremental computation is characterized by "d*n."

In some implementations, one or more values can be updated. This corresponds to a relaxation 716 performed on at least one of the geometries in the interconnected chart. This incremental computation is characterized by "d*n."

The interconnected chart 702F can be encoded in any suitable way. In some implementations, the line-based chart is encoded as a tuple list (e.g., as a flat edges list or a flat nodes list.) The following are examples of usage:

```
<circle ... > <path ... >
<circle ... > <path ... >
<circle ... >
{new Ellipse2D ...; new Polygon ...;
 new Ellipse2D ...; new Polygon ...;
 new Ellipse2D ...;}
```

Some examples of optimization will now be described. FIG. 8 shows an example of optimizing visualizations 800. In some implementations, these operations can be performed by the optimizer 514 and the scheduler 516 in FIG. 5.

Optimization can be performed on any type of visualization and/or with regard to any type of data. Here, two types of visualizations will be used as examples. The visualizations 800 include a line chart visualization 800A and a scatter plot visualization 800B. For the line chart visualization 800A, the number of geometric dimensions to be computed is two, as indicated by dimension 802A. The scatter plot visualization 800B has three dimensions, as indicated by dimension 802B. The visualizations 800 are based on data 804A and B, respectively.

Some additional parameters that can affect the optimization are also indicated. For example, target device parameters 806 are specific to the client device (e.g., to the type of device.) User/rendering parameters 808 can be user configurable or determined by the device. Visualization parameters 810 relate to the particular visualization(s) 800.

The following is an example of optimization for one visualization, in which some definitions from the parameters 806-10 are used:

| | | |
|---|---|---|
| cpuLoad | = d*n*f/p | //consumed percentage of CPU instructions |
| batteryLoad | = d*n*f*3600/b | //consumed percentage of CPU bound //battery life after an hour |

An optimization rule applied to the above example is then illustrated by the following pseudocode:

```
IF cpuLoad > 0.5 OR batteryLoad > 0.1 THEN compute in backend
ELSE compute in frontend
```

The following is an example of optimization for k number of concurrent visualizations:

| | |
|---|---|
| cpuLoad | = SUM($d_1*n_1, ..., d_k*n_k$)*f/p |
| batteryLoad | = SUM($d_1*n_1, ..., d_k*n_k$)*f*3600/p |

An optimization rule applied to the above example is then illustrated by the following pseudocode:

```
IF cpuLoad > 0.5 OR batteryLoad > 0.1 THEN
    schedule most expensive visualization to backend
    reoptimize using the remaining visualizations
ELSE compute remaining visualizations in frontend
```

Other optimizations can be used. In some implementations, the scheduling can use one or more dynamic parameters. For example, the cpuLoad comparator and/or the batteryLoad comparator can be replaced with a dynamic parameter, such that, in the above example, 0.5 is replaced with a parameter "cpuLoadBoundary" and 0.1 is replaced with a parameter "batteryLoadBoundary."

Figure 9:
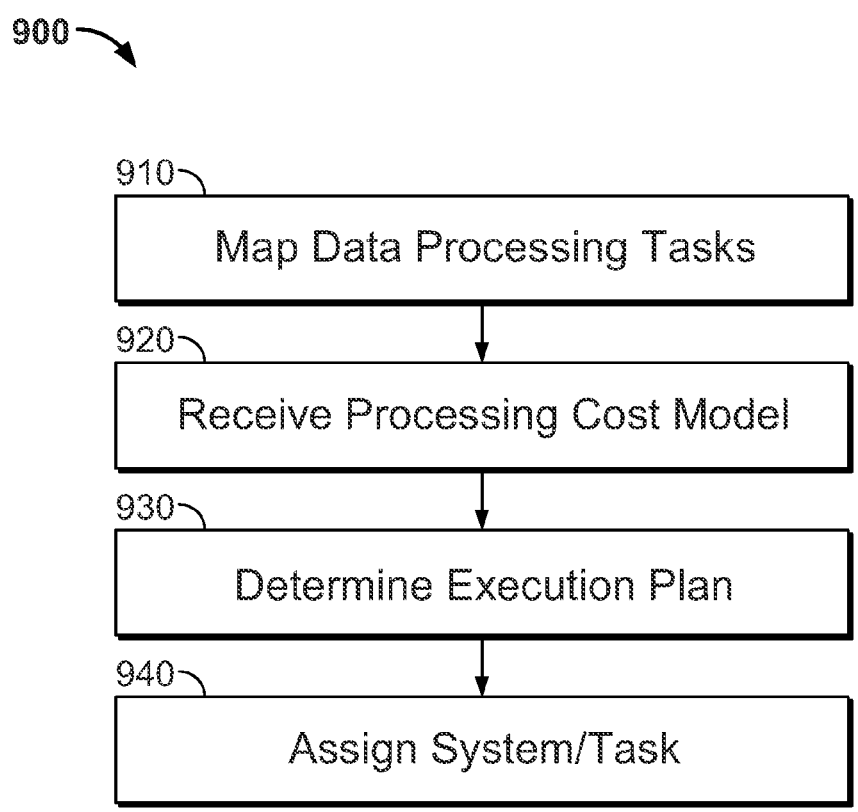
FIG. 9 shows an example flowchart of a method for distributing pre-rendering processing tasks.

FIG. 9 shows an example flowchart of a method 900 for distributing pre-rendering processing tasks. The method 900 can be performed by one or more processors executing instructions stored in a computer-readable medium. For example, the method 900 can be performed in the system 100, 400 and/500.

At 910, data processing tasks are mapped. In some implementations, the middleware system 504 (FIG. 5) can map data processing tasks to the visualization processing model 518 for a real-time visualization that involves data from the backend system 502 (FIG. 5) to be rendered by the frontend system 506 (FIG. 5.) For example, the data can be real-time stock market information obtained using one or more of the data sources 524 (FIG. 5.)

At 920, a processing cost model is received. In some implementations, the middleware system 504 can receive the processing cost model 526 which is derived based on processing-node information about the frontend system 506. For example, the processing cost model can indicate processing costs and/or constraints associated with a client device.

At 930, an execution plan is determined. In some implementations, the optimizer component 514 determines the execution plan 528 regarding a real-time visualization. The execution plan is determined using the mapped data processing tasks and the models. For example, the execution plan can assign, for each of the visualization operators 512 (FIG. 5), whether the operation should be performed in the backend or the frontend.

At 940, a system and/or task is assigned. In some implementations, the middleware system 504 assigns, for each of the visualization operators 512, whether the operator should be implemented in the backend or the frontend. In other implementations, the task of performing the operation is assigned to the corresponding visualization operator in either the backend or the frontend. The assignments are done according to the determined execution plan.

One or more other steps can be performed, before, after and/or between the steps discussed above. As another example, the steps can be performed in another order.

Figure 10:
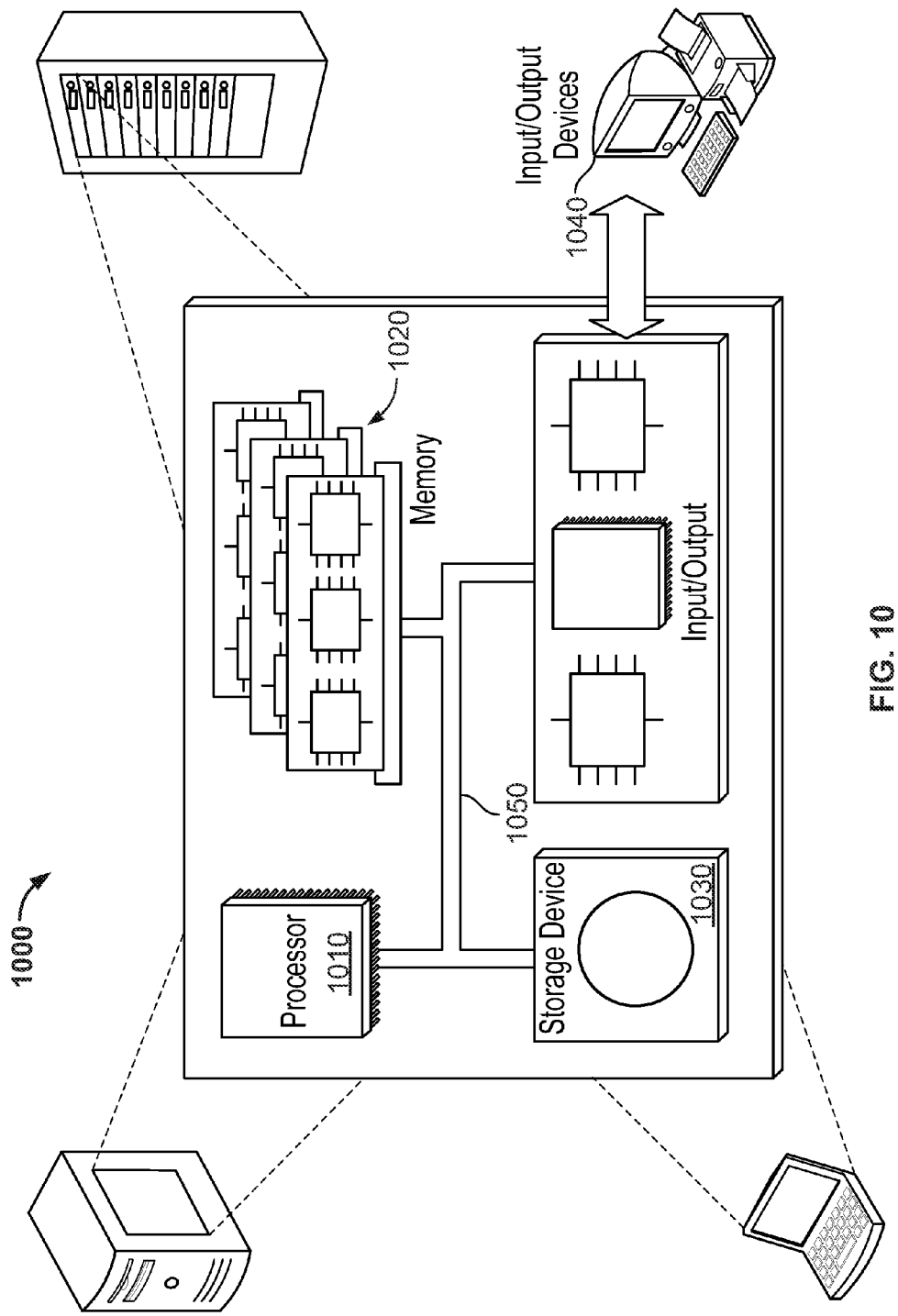
FIG. 10 is a block diagram of a computing system that can be used in connection with computer-implemented methods described in this document.

FIG. 10 is a schematic diagram of a generic computer system 1000. The system 1000 can be used for the operations described in association with any of the computer-implement methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. The memory 1020 is a volatile memory unit in some implementations and is a non-volatile memory unit in other implementations.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for distributing pre-rendering processing tasks, the method comprising:
    mapping visual pre-rendering data processing tasks in a real-time visualization to a visualization processing model, the real-time visualization involving data from a backend system to be rendered by a frontend system;
    receiving a processing cost model derived from frontend system processing-node information, the cost model computing a cost based at least in part on one or more visual operators determined from a decomposition of a particular visual pre-rendering data processing task during the mapping;
    determining, using the mapped data processing tasks and the models, an execution plan for the real-time visualization; and
    for each of the mapped data processing tasks, and according to the determined execution plan, assigning the backend system or the frontend system to perform the task.

2. The computer-implemented method of claim 1, wherein mapping the data processing tasks comprises identifying at least one geometric primitive.

3. The computer-implemented method of claim 2, wherein the real-time visualization comprises adding data to, or removing data from, the identified geometric primitive.

4. The computer-implemented method of claim 1, wherein the real-time visualization comprises updating a data value for the identified geometric primitive.

5. The computer-implemented method of claim 1, further comprising providing, after the mapped data processing tasks are performed, raw data and geometry from the backend system to the frontend system, the geometry obtained by the backend system performing at least one of the identified data processing tasks on the raw data.

6. The computer-implemented method of claim 1, further comprising determining, with regard to a different frontend, a different execution plan for the real-time visualization.

7. A computer program product embodied in a non-transitory computer-readable storage medium and comprising instructions that when executed by a processor perform a method for distributing pre-rendering processing tasks, the method comprising:
    mapping visual pre-rendering data processing tasks in a real-time visualization to a visualization processing model, the real-time visualization involving data from a backend system to be rendered by a frontend system;
    receiving a processing cost model derived from frontend system processing-node information, the cost model computing a cost based at least in part on one or more visual operators determined from a decomposition of a particular visual pre-rendering data processing task during the mapping;
    determining, using the mapped data processing tasks and the models, an execution plan for the real-time visualization; and
    for each of the mapped data processing tasks, and according to the determined execution plan, assigning the backend system or the frontend system to perform the task.

8. The computer program product of claim 7, wherein mapping the data processing tasks comprises identifying at least one geometric primitive.

9. The computer program product of claim 8, wherein the real-time visualization comprises adding data to, or removing data from, the identified geometric primitive.

10. The computer program product of claim 7, wherein the real-time visualization comprises updating a data value for the identified geometric primitive.

11. The computer program product of claim 7, the method further comprising providing, after the mapped data processing tasks are performed, raw data and geometry from the backend system to the frontend system, the geometry obtained by the backend system performing at least one of the identified data processing tasks on the raw data.

12. The computer program product of claim 7, the method further comprising determining, with regard to a different frontend, a different execution plan for the real-time visualization.

13. A system comprising:
    one or more processors; and
    a computer program product embodied in a non-transitory computer-readable storage medium and comprising instructions that when executed perform a method for distributing pre-rendering processing tasks, the method comprising:
        mapping visual pre-rendering data processing tasks in a real-time visualization to a visualization processing model, the real-time visualization involving data from a backend system to be rendered by a frontend system;
        receiving a processing cost model derived from frontend system processing-node information, the cost model computing a cost based at least in part on one or more visual operators determined from a decomposition of a particular visual pre-rendering data processing task during the mapping;
        determining, using the mapped data processing tasks and the models, an execution plan for the real-time visualization; and
        for each of the mapped data processing tasks, and according to the determined execution plan, assigning the backend system or the frontend system to perform the task.

14. The system of claim 13, wherein mapping the data processing tasks comprises identifying at least one geometric primitive.

15. The system of claim 14, wherein the real-time visualization comprises adding data to, or removing data from, the identified geometric primitive.

16. The system of claim 13, wherein the real-time visualization comprises updating a data value for the identified geometric primitive.

17. The system of claim 13, the method further comprising providing, after the mapped data processing tasks are performed, raw data and geometry from the backend system to the frontend system, the geometry obtained by the backend system performing at least one of the identified data processing tasks on the raw data.

18. The system of claim 13, the method further comprising determining, with regard to a different frontend, a different execution plan for the real-time visualization.

\* \* \* \* \*